(12) United States Patent
Johnson et al.

(10) Patent No.: US 11,493,279 B2
(45) Date of Patent: Nov. 8, 2022

(54) THERMAL MANAGEMENT USING ENDOTHERMIC HEAT SINK

(71) Applicant: Government of the United States, as represented by the Secretary of the Air Force, Wright-Patterson AFB, OH (US)

(72) Inventors: Douglas J. Johnson, Kent, OH (US); Nicholas P. Niedbalski, Springfield, OH (US); Jamie S. Ervin, Springboro, OH (US); Soumya S. Patnaik, Mason, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 113 days.

(21) Appl. No.: 17/195,683

(22) Filed: Mar. 9, 2021

(65) Prior Publication Data

US 2021/0190434 A1 Jun. 24, 2021

Related U.S. Application Data

(62) Division of application No. 15/903,287, filed on Feb. 23, 2018, now Pat. No. 10,578,369.

(51) Int. Cl.
*F28D 15/00* (2006.01)
*F28D 15/02* (2006.01)
(Continued)

(52) U.S. Cl.
CPC ......... *F28D 15/0266* (2013.01); *B64G 1/423* (2013.01); *F28D 15/06* (2013.01);
(Continued)

(58) Field of Classification Search
CPC .... F28D 15/0266; F28D 15/06; F28D 20/003; F28D 20/02; F28D 2021/0021; F28D 2021/0022; F28D 2021/0029; B64G 1/423
(Continued)

(56) References Cited

U.S. PATENT DOCUMENTS 4,173,615 A 11/1979 Otsuka et al.
5,232,672 A 8/1993 Spadaccini et al.
(Continued)

OTHER PUBLICATIONS

Niedbalski, N. et al., "Study of a multi-phase hybrid heat exchanger-reactor (HEX reactor): Part I—Experimental characterization," International Journal of Heat and Mass Transfer 70 (2014), pp. 1078-1085, Nov. 16, 2013.
(Continued)

*Primary Examiner* — Claire E Rojohn, III
(74) *Attorney, Agent, or Firm* — AFMCLO/JAZ; Timothy M. Barlow

(57) ABSTRACT

A thermal management system includes a slurry generator, an injector pump coupled to the slurry generator, a heat exchanger reactor coupled to the injector pump, wherein the heat exchanger reactor is adapted to subject a thermally expendable heat absorption material to a temperature above 60° C. and a pressure below 3 kPa, and wherein the expendable heat absorption material endothermically decomposes into a gaseous by-product. A vapor cycle system is coupled to the heat exchanger reactor and is operatively connected to a thermal load. A thermal energy storage system may be coupled to the vapor cycle system and the thermal load. The thermal energy storage system may isolate the heat exchanger reactor from thermal load transients of the thermal load.

9 Claims, 11 Drawing Sheets

(51) Int. Cl.
- *F28D 15/06* (2006.01)
- *B64G 1/42* (2006.01)
- *F28D 20/02* (2006.01)
- *F28D 20/00* (2006.01)
- *F28D 21/00* (2006.01)

(52) U.S. Cl.
CPC .......... *F28D 20/003* (2013.01); *F28D 20/02* (2013.01); *F28D 2021/0021* (2013.01); *F28D 2021/0022* (2013.01); *F28D 2021/0029* (2013.01)

(58) Field of Classification Search
USPC .................................................. 165/104.21
See application file for complete search history.

(56) References Cited

U.S. PATENT DOCUMENTS

| | | | |
|---|---|---|---|
| 5,313,790 | A | 5/1994 | Barr |
| 5,414,992 | A | 5/1995 | Glickstein |
| 7,955,568 | B2 | 6/2011 | Ullman et al. |
| 8,206,470 | B1 | 6/2012 | Jacobson |
| 8,820,723 | B1 | 9/2014 | Sparrow et al. |
| 9,038,390 | B1 | 5/2015 | Kreuger |
| 9,543,787 | B2 | 1/2017 | Duchesneau |
| 9,677,817 | B1* | 6/2017 | Dudis ............... F28F 27/00 |
| 9,863,725 | B1* | 1/2018 | Dudis ............... F28F 23/00 |
| 2007/0095076 | A1* | 5/2007 | Duke ................ C10G 1/04 62/49.2 |
| 2007/0160516 | A1* | 7/2007 | Boryta ............. C01D 15/08 422/600 |
| 2010/0205981 | A1* | 8/2010 | Bolin ................ C09K 5/047 62/238.3 |
| 2010/0236758 | A1* | 9/2010 | Ullman .............. F28D 15/00 165/104.19 |
| 2013/0316850 | A1 | 11/2013 | Inoue et al. |
| 2014/0352351 | A1 | 12/2014 | Xu |
| 2015/0143806 | A1 | 5/2015 | Friesth |

OTHER PUBLICATIONS

Niedbalski, N. et al., "Study of a multi-phase hybrid heat exchanger-reactor (HEX reactor): Part II—Numerical prediction of thermal performance," International Journal of Heat and Mass Transfer 70 (2014), pp. 1086-1094, Nov. 16, 2013.

Johnson, D. et al., "An Integrated Chemical Reactor-heat Exchanger based on Ammonium Carbamate," Paper presented at SAE 2012 Power Systems Conference, held in Phoenix, Arizona from Oct. 30 through Nov. 1, 2012, and published in the Proceedings of the SAE 2012 Power Systems Conference, 2012, SAE International, p. 1-6.

Johnson, D. et al., "Ammonium carbamate-based heat exchanger reactor as an endothermic heat sink for thermal management," International Journal of Heat and Mass Transfer 91 (2015), pp. 766-776, Aug. 24, 2015.

Patnaik, S. et al., "Multiscale Modeling of Multiphase Fluid Flow," Air Force Research Laboratory Report No. AFRL-RQ-WP-TR-2016-0115, Aug. 2016, 132 pages.

Schmidt et al., Expendable High Energy Density Thermal Management Material: Ammonium Carbamate, Journal of Thermophysics and Heat Transfer, vol. 26, No. 2, Apr.-Jun. 2012, pp. 345-351.

Tsao, B. et al., "Power, Thermal and Control Technologies and Processes Experimental Research," Air Force Research Laboratory Report No. AFRL-RQ-WP-TR-2015-0132, Aug. 2015, 284 pages.

* cited by examiner

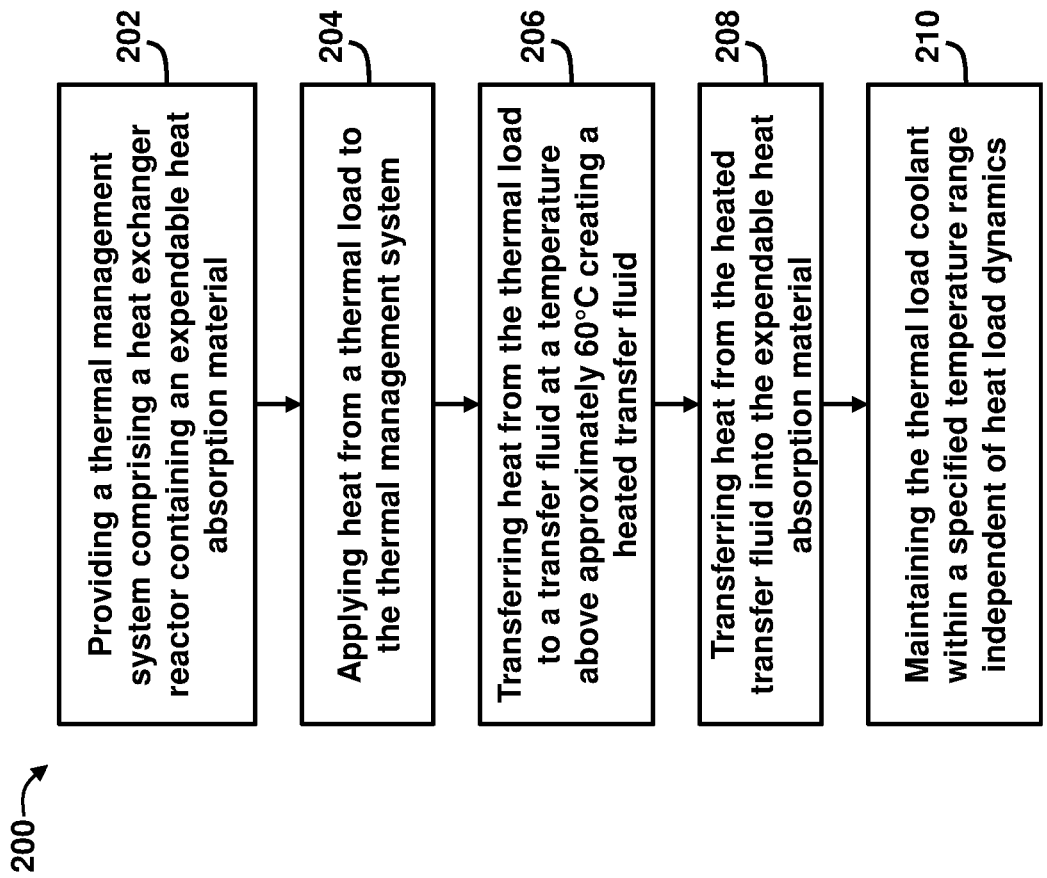

THERMAL MANAGEMENT USING ENDOTHERMIC HEAT SINK

GOVERNMENT INTEREST

The invention described herein may be manufactured and used by or for the Government of the United States for all government purposes without the payment of any royalty.

BACKGROUND

Field of the Invention

The embodiments herein generally relate to thermal management systems, and more particularly to using ammonium carbamate for thermal management systems.

Background of the Invention

High-performance aircraft are experiencing increased use of high-power electronics. Many of these electronic systems produce high-flux, low-grade heat that must be removed to avoid component failure. The dissipation of high-flux, low-grade heat from an aircraft presents unique challenges. High-flux loads generally require large, high-capacity cooling systems. Low-grade heat rejection typically requires large heat dissipation surfaces, which may not be readily integrated into airframes. New composite materials which have low thermal conductivities are being used for airframes and present further thermal management challenges. In addition, an aircraft's operating envelope may preclude dissipating low-grade heat to the atmosphere due to high aircraft skin and stagnation air temperatures during high-speed flight. Jet fuel has been used to absorb heat from aircraft systems before combustion. However, jet fuel may degrade in the presence of heat and dissolved $O_2$ may form surface deposits and block fuel passages. Furthermore, the available heat sink decreases in time as the jet fuel is consumed. Thus, the use of jet fuel for thermal management is not without limitations, and alternative techniques to dissipate the heat are required. Accordingly, the issue of managing low-quality waste heat onboard modern high-performance aircraft represents a critical performance limitation that can severely restrict flight envelopes, preclude the integration of high-power electronics, or compromise system reliability.

BRIEF SUMMARY OF THE INVENTION

In view of the foregoing, an embodiment herein provides a thermal management system comprising a slurry generator; an injector pump coupled to the slurry generator; a heat exchanger reactor coupled to the injector pump, wherein the heat exchanger reactor is adapted to subject a thermally expendable heat absorption material to a temperature above 60° C. and a pressure below 3 kPa, and wherein the expendable heat absorption material endothermically decomposes into a gaseous by-product; and a vapor cycle system coupled to the heat exchanger reactor and operatively connected to a thermal load.

The system may comprise a thermal energy storage system coupled to the vapor cycle system and the thermal load. The thermal energy storage system may isolate the heat exchanger reactor from thermal load transients of the thermal load. The heat exchanger reactor may receive a pulsed heat load of specified heating rates from the thermal load. The expendable heat absorption material may comprise an ammoniated salt. The expendable heat absorption material may comprise any of ammonium carbamate and ammonium bicarbonate. The system may comprise a controller operatively connected to the vapor cycle system to control a temperature of the thermal load being applied to the vapor cycle system to approximately an ambient temperature surrounding the thermal load.

Another embodiment provides a heat sink comprising a heat exchanger reactor to permit an expendable heat absorption material to absorb heat from a thermal load at a temperature above 60° C. and a pressure below 3 kPa, wherein the expendable heat absorption material endothermically decomposes; a vapor cycle system coupled to the heat exchanger reactor and configured to transfer heat from the thermal load; a first controller to regulate a heat absorption into the vapor cycle system; and a second controller to regulate an amount of the expendable heat absorption material into the heat exchanger reactor. The heat sink may comprise a heat capacitor to isolate the heat exchanger reactor from thermal transients of the thermal load. The expendable heat absorption material may comprise an ammoniated salt. The heat sink may comprise a carrier fluid mixed with the expendable heat absorption material, wherein the carrier fluid comprises any of ethylene glycol and propylene glycol.

Another embodiment provides a method for managing heat transfer of a thermal load, the method comprising providing a thermal management system comprising a heat exchanger reactor containing an expendable heat absorption material; applying heat from a thermal load to the thermal management system at a temperature between approximately 18-30° C. using a thermal load coolant; transferring heat from the thermal load to a transfer fluid at a temperature above approximately 60° C. creating a heated transfer fluid, wherein the heated transfer fluid is introduced into the heat exchanger reactor; transferring heat from the heated transfer fluid into the expendable heat absorption material, wherein the expendable heat absorption material endothermically decomposes into a gaseous by-product; and maintaining the thermal load coolant within a specified temperature range independent of heat load dynamics.

The method may comprise applying the heat from the thermal load at a steady rate, or the method may comprise applying the heat from the thermal load at an unsteady rate. The method may comprise calculating an amount of heat transfer from the thermal load to the expendable heat absorption material. The expendable heat absorption material may comprise an ammoniated salt. The expendable heat absorption material may comprise any of ammonium carbamate and ammonium bicarbonate. The method may comprise suspending the expendable heat absorption material in a carrier fluid comprising any of ethylene glycol and propylene glycol. The method may comprise isolating the heat exchanger reactor from thermal transients of the thermal load. The method may comprise controlling a temperature of the thermal load to approximately an ambient temperature surrounding the thermal load.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 11 is a flow diagram illustrating a method for managing heat transfer of a thermal load, according to an embodiment herein.

DETAILED DESCRIPTION OF THE INVENTION

Figure 1:
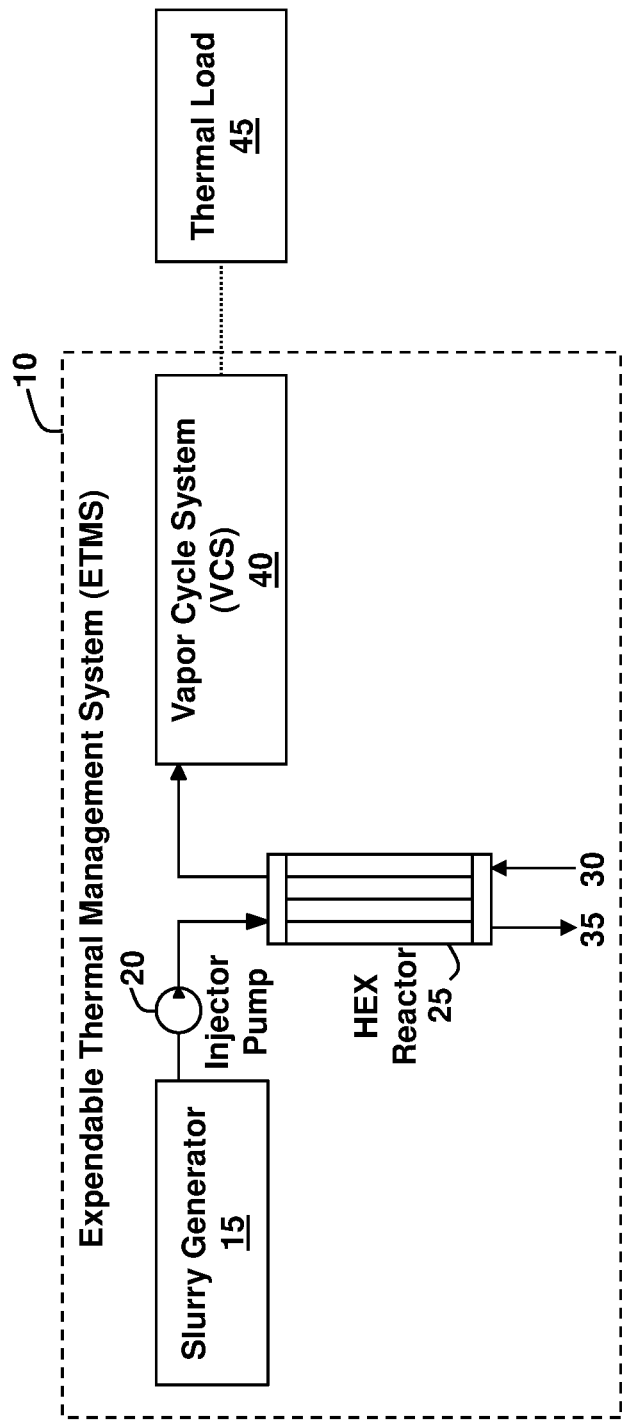
FIG. 1 is a block diagram illustrating a thermal management system used for a steady-state thermal load, according to an embodiment herein.

Embodiments of the disclosed invention, its various features and the advantageous details thereof, are explained more fully with reference to the non-limiting embodiments that are illustrated in the accompanying drawings and detailed in the following description. Descriptions of well-known components and processing techniques are omitted to not unnecessarily obscure what is being disclosed. Examples may be provided and when so provided are intended merely to facilitate an understanding of the ways in which the invention may be practiced and to further enable those of skill in the art to practice its various embodiments. Accordingly, examples should not be construed as limiting the scope of what is disclosed and otherwise claimed.

In the drawings, the size and relative sizes of layers and regions may be exaggerated for clarity. The principal engineering challenges to the thermal systems engineer are the large quantities of heat involved, low (and carefully controlled) coolant temperatures required, and the limited availability of heat sinks to which the waste heat must ultimately be rejected. The use of endothermic chemical reactions to serve as controllable, flight envelope-independent heat sinks has considerable potential in addressing the latter of the aforementioned engineering challenges, but must be integrated as part of a systems-level approach in order to address all three: acquisition, control, and rejection. The embodiments herein provide an expendable thermal management system (ETMS) architecture integrating a vapor compression heat pump, phase change thermal energy storage, and heat exchanger-reactor (HEX reactor) to utilize the endothermic decomposition of ammonium carbamate as an expendable heat sink. Referring now to the drawings, and more particularly to FIGS. 1 through 11, where similar reference characters denote corresponding features consistently throughout, there are shown exemplary embodiments.

FIG. 1 illustrates a thermal management system 10 comprising a slurry generator 15, an injector pump 20 coupled to the slurry generator 15, and a heat exchanger (HEX) reactor 25 coupled to the injector pump 20. The HEX reactor 25 is adapted to subject a thermally expendable heat absorption material 30 to a temperature above 60° C. and a pressure below 3 kPa. The expendable heat absorption material 30 endothermically decomposes into a gaseous by-product 35. In an example, the expendable heat absorption material 30 comprises an ammoniated salt such as ammonium carbamate. More particularly, the ammonium carbamate may have a decomposition temperature of 60° C. and enthalpy of decomposition of 2.01 MJ/kg in one example, and a decomposition temperature of 85° C. and enthalpy of decomposition of 1.97 MJ/kg in another example. Moreover, another example of the expendable heat absorption material 30 includes ammonium bicarbonate having a decomposition temperature of 85° C. and an enthalpy of decomposition of 2.12 MJ/kg. The system further comprises a vapor cycle system 40 coupled to the HEX reactor 25 and operatively connected to a thermal load 45.

Figure 2:
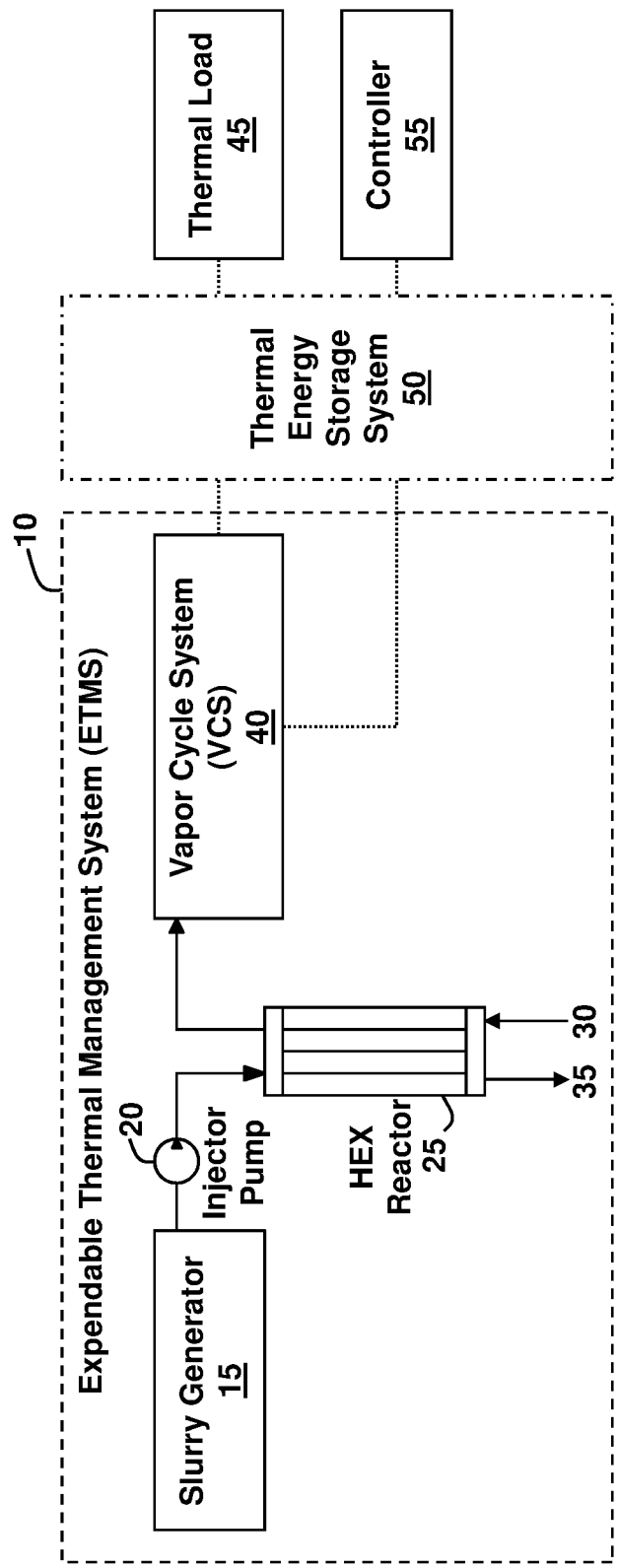
FIG. 2 is a block diagram illustrating a thermal management system integrated with a thermal energy storage system used for a dynamic thermal load, according to an embodiment herein.

As shown in FIG. 2, with reference to FIG. 1, the system 10 may comprise a thermal energy storage system 50 coupled to the vapor cycle system 40 and the thermal load 45. The thermal energy storage system 50 may isolate the heat exchanger reactor 25 from thermal load transients of the thermal load 45. The HEX reactor 25 may receive a pulsed heat load of specified heating rates from the thermal load 45. The expendable heat absorption material 30 may comprise an ammoniated salt. The expendable heat absorption material 30 may comprise any of ammonium carbamate and ammonium bicarbonate. The system 10 may comprise a controller 55 operatively connected to the vapor cycle system 40 to control a temperature of the thermal load 45 being applied to the vapor cycle system 40 to approximately an ambient temperature surrounding the thermal load 45. In an example, the controller 55 may be any type of processor, microcontroller, application specific processor, application specific integrated circuit, or digital signal processor.

The cooling technique provided by the embodiments herein utilizes an expendable heat absorption material 30 that absorbs heat and then is expelled. The material 30 undergoes an endothermic chemical reaction. Endothermic chemical reactions may involve greater changes in enthalpy relative to sensible heating or thermophysical phase change. An example of the material 30 that undergoes endothermic decomposition with high enthalpy change is ammonium carbamate (AC), which is a solid ammonium salt that decomposes into carbon dioxide and ammonia gases in the temperature range of 10-60° C.:

$$[NH_4][H_2NCOO] \leftrightarrows CO_2 + 2NH_3 \quad (1)$$

Figure 3:
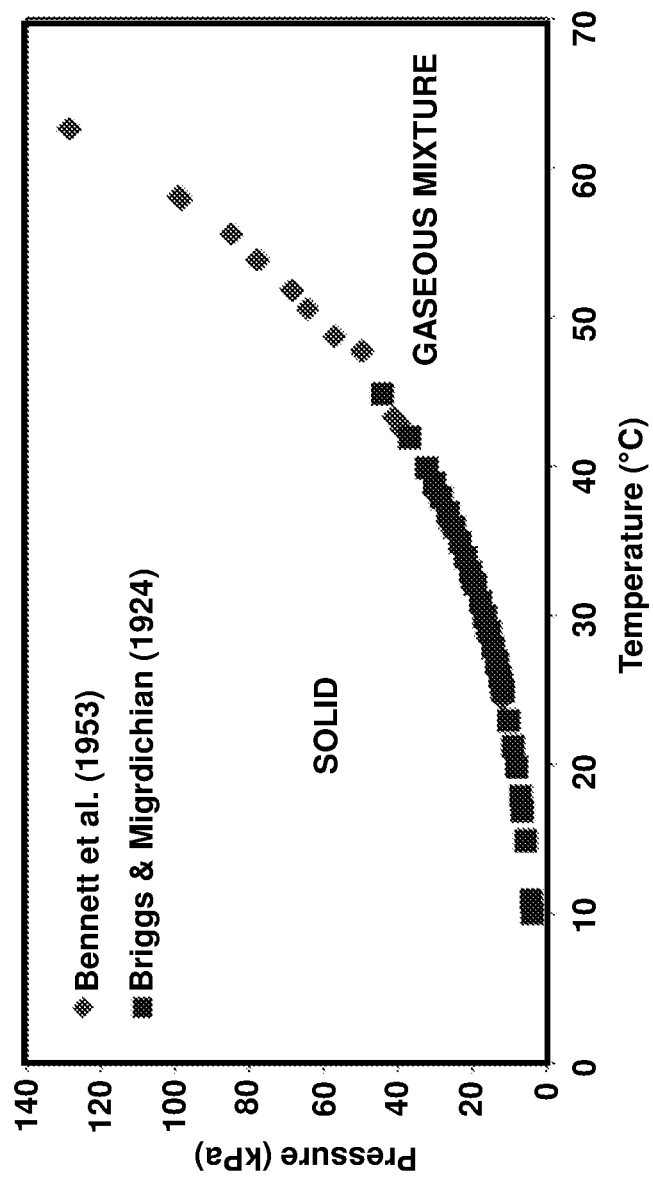
FIG. 3 is a graphical illustration of an ammonium carbamate (AC) decomposition curve.

The enthalpy of decomposition for AC is approximately 2 MJ/kg, which compares well with water vaporization at atmospheric pressure. FIG. 3 shows solid-gas decomposition pressures at different temperatures for AC. In an example, ammonium carbonate can slowly decompose at standard temperature (e.g., 0° C.) and pressure (e.g., 100 kPa). There is a wide range of temperatures and pressures over which decomposition can occur. For example, FIG. 3 shows that the solid material tends to decompose into a gaseous mixture when heated above 60° C. at 100 kPa, or when the pressure is reduced below 10 kPa at 20° C. To facilitate heat and mass transfer, AC can be suspended in a carrier fluid. According to an example, AC can be suspended in ethylene glycol or propylene glycol (PG) and such that, decomposing in a batch reactor under reduced pressure, heat from the thermal load 45 will be absorbed. A chevron plate heat exchanger (CPHE) may be utilized as the HEX reactor 25 to enable continuous heat absorption via AC decomposition. HEX reactor 25 is a promising means of realizing the thermal management potential of AC because it can offer a high volumetric heat transfer capacity to effect high reaction yields Continuous heat absorption in a HEX reactor 25 may be achieved by subjecting a slurry of AC suspended in propylene glycol (PG) to elevated temperatures under atmospheric and reduced pressures. The rate of heat rejection is sensitive to the reaction temperature (i.e., the temperature at which the AC/PG mixture decomposes), and operation under reduced pressure allows the process to achieve the objective of near 100% AC decomposition into the gases described above. The HEX reactor 25 in the thermal management system 10 utilizes integration with a mechanism to control reaction temperature, and an assessment of the HEX reactor's 25 response to time variant heat loads. Accordingly, the embodiments herein provide for the endothermic decomposition of AC in a HEX reactor 25 as part of a thermal management system 10 to control the temperature of the thermal load 45. In an example, the mixture of the AC and PG is subjected to elevated temperatures (above 60° C.) and reduced pressures (below 3 kPa) for at least one minute.

Experiment

Figure 4:
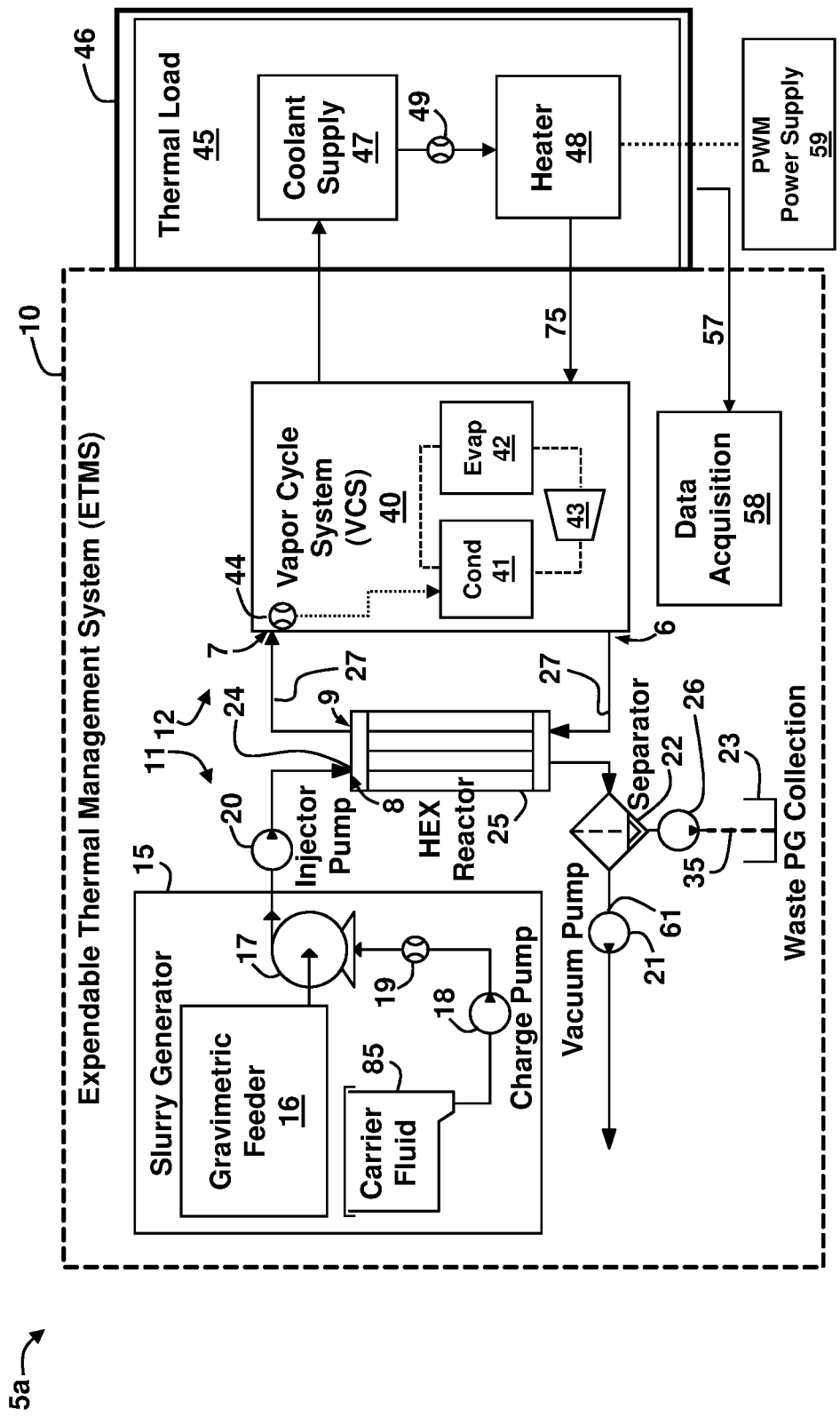
FIG. 4 is a block diagram illustrating an apparatus used for a steady-state thermal load, according to an embodiment herein.
Figure 5:
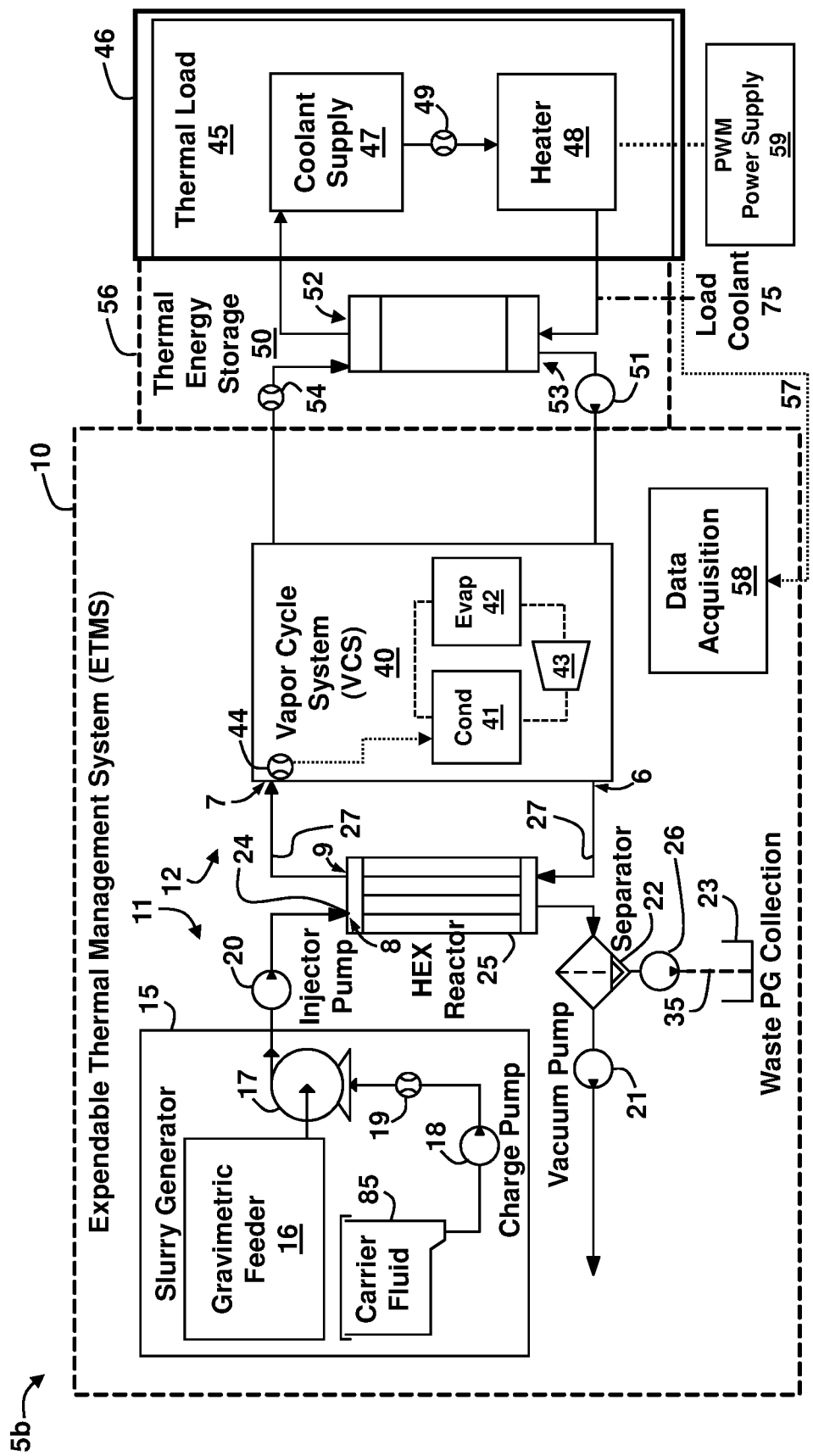
FIG. 5 is a block diagram illustrating an apparatus including a thermal management system used for a dynamic thermal load, according to an embodiment herein.

Two experimental configurations were used to investigate either steady (FIG. 4) or dynamic (FIG. 5) heat loads 45. FIGS. 4 and 5, with reference to FIGS. 1 through 3, show the experimental apparatus 5a, 5b for the two load conditions, steady and dynamic, which can be divided into subsystems 10, 46. As illustrated in FIGS. 4 and 5 and described below the various components and parameters are merely provided as experimental examples, and the embodiments herein are not restricted to these particular components, configurations, or parameters. The subsystem 10 depicted on the left side of FIGS. 4 and 5 is the ETMS 10 comprising the HEX reactor 25, slurry generator 15, vacuum pump 21, and liquid/gas separator 22. The subsystem 46 on the right side is the imposed heat load 45 which has the capability to provide either steady or dynamic heat loads. A third subsystem 56 (shown in FIG. 5) interposed between the ETMS 10 and the imposed load 45 is the thermal energy storage (TES) system 50 which acts as a thermal capacitance in the apparatus 5b.

The HEX reactor 25 generally comprises a reactant side 11 and a transfer side 12. In one example, the HEX reactor 25 may comprise plate heat exchangers, which may provide enhanced mixing and high surface area-to-volume ratios, which enable high thermal power densities. Some examples of the configuration of the HEX reactor 25, which may be utilized, are described in Niedbalski, N., et al., "Study of a multi-phase hybrid heat exchanger-reactor (HEX reactor): Part I—Experimental characterization," International Journal of Heat and Mass Transfer 70 (2014) 1078-1085; Niedbalski, N., et al., "Study of a multi-phase hybrid heat exchanger-reactor (HEX reactor): Part II—Numerical prediction of thermal performance," International Journal of Heat and Mass Transfer 70 (2014) 1086-1094; and Johnson, D., et al., "An Integrated Chemical Reactor-heat Exchanger based on Ammonium Carbamate," Proceedings of the SAE 2012 Power Systems Conference, Oct. 22, 2012, the complete disclosures of which, in their entireties, are herein incorporated by reference. FIGS. 4 and 5 show that the HEX reactor 25 is operatively connected to the slurry generator 15 and the vapor cycle system 40.

The slurry generator 15 may comprise a gravimetric feeder 16, a mixer 17, and a charge pump 18. The mixer 17 connects to the slurry injector pump 20. The gravimetric powder feeder 16 meters the expendable heat absorption material 30, which may be dry AC powder (hereinafter referred to as "AC"), into the mixer 17, which suspends the AC in a carrier fluid 85, which is metered into the mixer 17 using the charge pump 20. A flow meter 19 may be used to control the flow of the carrier fluid 85 into the mixer 17. An example of the carrier fluid 85, which may be used, is ≥99.5% grade PG available from Sigma-Aldrich Corporation, Missouri, USA. The carrier fluid 85, which is a heat transfer fluid, and PG may be utilized since it is non-toxic and enhances the decomposition rate relative to pure AC powder in air. In an example, the carrier fluid 85 used to generate the slurry may initially be provided at room temperature. The AC/PG slurries are generated such that the AC feed rate and PG flow rate may be adjusted to accommodate a desired AC concentration. In an example, the slurry flow rate range may be approximately 0.5-0.8 L/min, with AC/PG ratios of approximately 240-360 g of AC per L of PG.

The AC/PG slurry is pumped into the HEX reactor 25 via the slurry injector pump 20. Varying the PG flow rate of the slurry generator 15 also varies the reactor residence time, which is the amount of time the AC/PG slurry spends in the HEX reactor 25. A liquid-gas separator 22 removes undissolved waste gases 35 from the PG. The PG containing dissolved waste products (e.g., waste gases 35) and unreacted AC is pumped into a waste container 23.

As shown in FIGS. 4 and 5, a vacuum pump 21 may be provided downstream of the liquid-gas separator 22 to reach a desired pressure in the reactant side 11 of the HEX reactor 25. The HEX reactor 25 pressure does not have to be actively controlled, according to an example. Rather, the resulting pressure in the HEX reactor 25 may be a consequence of the capacity of the vacuum pump 21 and the volume of undissolved gas produced in the HEX reactor 25. The pressure in the slurry line upstream of the HEX reactor 25 may be maintained above the decomposition pressure for a given temperature (as indicated in FIG. 3) to inhibit decomposition before the slurry enters the HEX reactor 25. This may be achieved by the presence of a small inlet orifice 24 at the inlet 8 of the HEX reactor 25. In an example, the inlet orifice 24 may be approximately 1.6 mm, although other configurations are possible. The slurry injector pump 20 acts as an additional pressure isolator between the HEX reactor 25 and the mixer 17, which prevents premature decomposition in the slurry.

The system 10 may be operated in an open-loop manner such that there is no feedback of the output of the system 10.

In an example, the carrier fluid 85, such as PG, may be supplied for slurry generation, pumped through the HEX reactor 25, and then removed from the system 10 after the AC is reacted. To remove waste material, such as gas 35, from the system 10, a vacuum-rated scavenge sump 21 may be provided to collect PG from the separator 22. Pressure in the scavenge sump 21 may be cycled between sub-ambient and ambient to permit PG removal.

The vapor-cycle system (VCS) 40 may be configured as a heat pump with associated controls. The VCS 40 is used to increase the temperature (e.g., approximately 16-18° C.) at which heat is absorbed from the thermal load coolant 75 to the reaction temperature (e.g., approximately 55-80° C.). The VCS 40 delivers the absorbed heat to the HEX reactor 25 through a water transfer loop 27 comprising an inlet 7 of the water transfer loop 27 to the VCS 40 from the HEX reactor 25, and an outlet 6 of the water transfer loop from the VCS 40 to the HEX reactor 25. The water in the transfer loop 27 may flow at the same rate as the thermal load coolant 75.

The thermal load 45 to be absorbed by the system 10 may be generated by the subsystem 46. The subsystem 46 may produce either steady-state or pulsed thermal loads 45. In an example, steady-state thermal loads 45 may be produced by preconditioning a water supply to a desired temperature in the range of approximately 15-60° C. The preconditioned water may then be pumped through an evaporator 42 in the VCS 40

The water may be heated by an inline heater 48. The power of the heater 48 may be controlled by a pulse width modulated (PWM) power supply 59, which may be programmed to produce power pulses of adjustable amplitude, duration, and duty cycle. The subsystem 46 may be controlled by a system-design software platform (not shown), such as the LabVIEW® program available from National Instruments Corporation, Texas, USA, which allows a desired supply temperature and heat pulse profile to be provided. A heater timer signal 57 may be sent from the subsystem 46 to a data acquisition component 58 in the system 10 to perform data analysis.

As provided in FIG. 5, the TES 50 is configured between the subsystem 46 and the system 10. The TES 50 may utilize a phase change process to store thermal energy. The TES 50 may have a phase-change temperature of approximately 18° C. and a water circulation pump 51. The TES 50 may be used as a thermal capacitance to isolate the HEX reactor 25 from heat load transients. The high temperature side 52 of the TES 50 is operatively connected to the subsystem 46, and the low temperature side 53 is operatively connected to the system 10. Additional instrumentation (not shown) may be provided such as thermocouples in the water ports and a flow meter in the subsystem 46 and TES 50.

The system 10 responds to temperature changes in the load source coolant 75 by independently modulating the heat pump capacity and sink conditions of VCS 40 (i.e., HEX reactor 25 slurry flow). In an example, the sequencing of the various components in the apparatus 5a, 5b is fully automated. The VCS heat pump process may be controlled by maintaining a constant superheat and inlet temperature of the evaporator 42. A hot gas bypass (HGBP) valve (not shown) may be utilized to maintain the inlet temperature of the evaporator 42. Control of these two variables allows the system 10 to adapt to both the magnitude and temperature of the thermal load 45. The HEX reactor 25 (e.g., sink) conditions may be controlled by specifying a reaction temperature range. The range may set the "on" and "off" reaction temperature setpoints, and when the reactant outlet temperature exceeds or falls below the respective setpoint, the slurry generator 15 and HEX reactor 25 are activated/deactivated, thereby starting/ceasing AC decomposition. The slurry generation parameters include the AC feed rate and PG flow rate, which are fixed to deliver a slurry of constant AC concentration when the slurry generator 15 and HEX reactor 25 are active. In an example of the experiment, the AC feed rate and PG mass flow rate may be set to approximately 1.8 g/s and 13 g/s, respectively. This particular AC feed rate/PG flow rate combination may deliver up to approximately 4500 W of cooling capacity assuming a decomposition enthalpy of 1800 J/g. The PG carrier fluid 85 provides an additional approximately 35 W/° C. cooling capacity.

At the interface of the system 10 and thermal load 45, the burden on the system 10 is set by the load source heat input (e.g., up to approximately 4 kW) and the coolant inlet temperature, while the target coolant outlet temperature serves as the constraint condition. The coolant inlet temperature may be varied between approximately 15° C. to 24° C. at a fixed flow rate of approximately 10 L/min, while the target coolant temperature may be set between approximately 10° C. and 18° C. with a maximum permissible error of ±2° C. Temperatures, pressures, and flow rates may then be measured. For example, thermocouples (not shown) may be positioned on ports (not shown) of the HEX reactor 25, the TES 50, and the load source coolant tank outlet (e.g., coolant supply 47). Pressure transducers (not shown) may be installed in the ports (not shown) of the reactant side 11 of the HEX reactor 25 and the inlet 61 to the vacuum pump 21. One or more turbine-type flow meters 19, 44, 49, 54 may be provided in the PG supply line, in the transfer loop, in the coolant loop, and in the TES 50 recharge loop, respectively. To ensure viability of the data, experimentally, all instruments are calibrated to provide values with less than 1% error. Table 1 lists example instrument ranges and uncertainties used in the experiment, however the embodiments herein are not restricted to these particular parameters.

TABLE 1

Instrument accuracies and ranges

| Instrument | Accuracy | Range | Mfg./Model |
|---|---|---|---|
| Pressure transducers | ±0.76% FS | 0-445 kPA | Omega ® PX409-050A5V |
| Thermocouples | ±0.1° C. | 5-105° C. | Omega ® KMQSS-062U-6 |
| Transfer loop flow meters (2) | ±0.1 L/min | 0.5-15 L/min | Omega ® FTB1412 |
| Load source coolant flow meter | ±0.1 L/min | 0.5-30 L/min | Omega ® FTB1412 |
| Propylene glycol flow meter | ±0.1 L/min | 0.15-3.5 L/min | Omega ® FTB205 |

Experiments were conducted to demonstrate the cooling capacity and temperature regulation capability of the system 10. Both steady-state (heat load not varying over the experiment) and dynamic heat load experiments were performed. For steady-state experiments, the system 10 was exposed to a steady flow of coolant 75 at a constant temperature for an extended period; approximately 5 min. The intent of these experiments was to demonstrate correct operation of the system 10, and to demonstrate that the cooling capacity of the system 10 could be controlled. Two subcases were considered in the experiment:

1. Steady-state heat transfer study subjected to a constant thermal load 45, without provisions to control the VCS capacity.
2. Steady-state heat transfer study subjected to a constant thermal load 45, with VCS capacity matched to the imposed heat load using a hot gas bypass method.

Dynamic heat load experiments subjected the system 10 to pulsed heat loads of specified heating rates. The purpose of these experiments was to demonstrate that the system 10 could maintain the coolant 75 within a specified temperature range, independent of heat load dynamics. These experiments were performed both without TES 50 (e.g., using the apparatus 5a in FIG. 4) and with TES 50 between the subsystem 46 and the VCS 40 (e.g., using the apparatus 5b in FIG. 5). All experiments were conducted and their respective adjustable parameters were tabulated, as provided in Table 2.

TABLE 2

Test matrix showing test designation and corresponding imposed coolant temperature, coolant outlet temperature constraint, and load source input. For the dynamic heat load experiments, the heat load reported is the peak load amplitude.

| Coolant IN (° C.) | Coolant OUT (° C.) | Heat load (kW) | Test description |
|---|---|---|---|
| 21.0 | 13.0 | 4.5 | Steady Load, Uncontrolled Capacity (Cap.) |
| 21.0 | 13.0 | 4.5 | Steady Load, Uncontrolled Cap. |
| 21.0 | 13.0 | 4.5 | Steady Load, Uncontrolled Cap., reduced superheat |
| 21.0 | 15.5 | 4.0 | Steady Load, Uncontrolled Cap. |
| 18.0 | 12.5 | 4.0 | Steady Load, Uncontrolled Cap. |
| 17.0 | 14.0 | 2.0 | Steady Load, Uncontrolled Cap. |
| 21.0 | 18.0 | 4.0 | Dynamic Load, No TES |
| 21.0 | 18.0 | 4.0 | Dynamic Load, TES integrated |

In general, the experimental procedure included a "preconditioning" phase during which the HEX reactor 25 was heated to the desired reaction temperature in the absence of AC, followed by a "decomposition" phase where the slurry flow from the slurry generator 15 was initiated to begin AC decomposition. The preconditioning phase served to mitigate the contribution of thermal capacitance, which may be due to steel face plates on the HEX reactor 25, to the energy balance analysis and ensured consistent initial conditions at the desired reaction temperature for each experiment. For the steady-state experiments, preconditioning was accomplished by using the VCS 40 to transfer thermal energy from the load coolant 75, which was preheated to the desired coolant inlet temperature, as shown in Table 2, to the HEX reactor 25 without absorbing heat via AC decomposition. The HEX reactor transfer loop was circulated continuously during this period. Once the HEX reactor 25 setpoint temperature was attained, the gravimetric feeder 16 and slurry injector pump 20 began generating and introducing the slurry into the HEX reactor 25 to begin the decomposition phase. The slurry loop continued to run until the AC supply in the gravimetric feeder 16 was depleted, marking the conclusion of the experiment.

The heat absorption/cooling rate by the system 10 may be determined by measuring the coolant temperature reduction. To generate the control set point for a controller 55 (shown in FIG. 2), the target coolant outlet temperature was calculated based on the imposed coolant inlet temperature and desired heat absorption rate:

$$T_{C,out} = T_{C,in} - \frac{q_C}{\dot{m}_c c_p} \quad (2)$$

where $T_{C,out}$ is the coolant outlet temperature, $T_{C,in}$ the coolant inlet temperature, $q_C$ is the rate of heat absorption from the coolant, $\dot{m}$ is the mass flow rate, and $c_p$ is the constant-pressure specific heat capacity of the coolant at the average bulk temperature. For the uncontrolled capacity experiments, the coolant inlet and outlet temperatures were set at approximately 21° C. and 13° C., respectively, to permit the system 10 to achieve its maximum heat rejection capacity.

The amount of thermal energy absorbed by the endothermic reaction was calculated from an energy balance analysis on the HEX reactor 25. Neglecting the heat transferred to the HEX reactor 25 itself, the heat absorbed by endothermic decomposition may be estimated by comparing the sensible energy changes in the slurry and transfer fluid streams in the HEX reactor 25:

$$q_{decomp} = q_{HEX,Tx} - q_{HEX,S} \quad (3)$$

where $q_{HEX,Tx}$ and $q_{HEX,S}$ are the rates of sensible energy change, respectively, of the transfer loop fluid and slurry occurring in the HEX reactor 25, and $q_{decomp}$ is the rate of heat consumption by the chemical reaction. In general, the energy balance for the reactant side 11 of the HEX reactor 25 is:

$$q_{HEX,Tx} = \int_{HEX,Tx} \frac{\partial T}{\partial t} \rho c_p dV + [\dot{m}_c c_p (T_{in} - T_{out})]_{HEX,Tx} \quad (4)$$

$$q_{HEX,S} = \int_{HEX,S} \frac{\partial T}{\partial t} \rho c_p dV + [\dot{m}_c c_p (T_{in} - T_{out})]_{HEX,S} \quad (5)$$

The inlet and outlet temperature histories for the HEX reactor 25 obtained from the experiments consistently showed that the slopes for $T_{in}$ and $T_{out}$ were nearly equal. Hence, it was assumed that $\partial T/\partial t$ does not vary appreciably over the length of the HEX reactor 25, and the integral terms on the right-hand side of Eqs. (4) and (5) may be approximated as:

$$\int_{HEX,Tx} \frac{\partial T}{\partial t} \rho c_p dV \approx V_{HEX,Tx} \left[ \rho c_p \frac{dT_{in}}{dT} \right]_{HEX,Tx} \quad (6)$$

$$\int_{HEX,Tx} \frac{\partial T}{\partial t} \rho c_p dV \approx V_{HEX,S} \left[ \rho c_p \frac{dT_{in}}{dT} \right]_{HEX,S} \quad (7)$$

where V is the volume of the transfer loop or slurry side of the HEX reactor 25 as indicated by the subscript. For most of the experiments conducted, the steady-state approximation could be invoked to reduce Eqs. (6) and (7) to:

$$q_{HEX,Tx} = [\dot{m}_c c_p (T_{in} - T_{out})]_{HEX,Tx} \quad (8)$$

$$q_{HEX,S} = [\dot{m}_c c_p (T_{in} - T_{out})]_{HEX,S} \quad (9)$$

For the experiments with dynamic heat loads and TES 50 incorporated between the system 10 and the thermal load 45, this simplification was applied to the energy balance analysis on account of the significant thermal capacitance of the TES 50 compared to that of the preconditioned HEX reactor 25 and VCS 40. The steady-state experiments with constant heat load showed that the preconditioned HEX reactor 25, which was based on the behavior of the slurry outlet temperature following the start of the AC decomposition, had first-order time constants of approximately 20-30 s, whereas the charge/discharge time for the TES 50 was approximately 5 min. The considerable difference in timescales permits the assumption that the HEX reactor 25 and VCS 40 experience only a small departure from steady state due to the transient recharging/discharging of the TES 50. In fact, it was only necessary to include the transient term in the energy balance for the steady heat load experiment with reduced capacity, as further described below.

As an additional thermal performance metric to be considered alongside the capacity and stability of the system 10, the coefficient of performance (COP) was utilized. The COP was computed as follows:

$$COP = \frac{q_{HEX,Tx}}{\dot{W}_{comp}} \tag{10}$$

where $\dot{W}_{comp}$ is the energy input from the VCS compressor 43 (including irreversibilities). Here, $\dot{W}_{comp}$ was estimated by a steady state energy balance on the transfer loop assuming no losses to the environment or thermal capacitances:

$$\dot{W}_{comp} \approx q_{HEX,Tx} - q_{evap,Tx} \tag{11}$$

where $q_{evap,Tx}$ is the heat transferred into the evaporator 42 from the coolant supply 47 or the TES 50. In effect, the COP is a measure of the thermal efficiency penalty for affecting a temperature lift. This manifests as additional heat that must be conveyed to the sink (i.e., AC decomposition).

To supplement the COP as a system performance measure, the effectiveness of the HEX reactor 25 was quantified by the conversion fraction; i.e., the ratio of AC mass fed to AC mass reacted. The conversion fraction, c, under steady conditions is given by:

$$\varepsilon = \frac{\dot{m}_{AC}}{q_{decomp}/\Delta H} \tag{12}$$

where $\dot{m}_{AC}$ is the feed rate of solid AC and $\Delta H$ is the heat of reaction for AC decomposition, which was assumed to be approximately 1800 kJ/kg. The effect of this assumption on the reported results is described below.

In the experiment, uncertainty propagation was estimated with the well-established Kline-McClintock method. Uncertainties associated with $q_{HEX,Tx}$, $q_{HEX,S}$, and $q_{evap,Tx}$ were approximately 2% based on the thermocouple and flow meter uncertainties tabulated in Table 1, and the constant transfer loop flow rate used throughout each experiment. The uncertainty in the calculated value of $\dot{W}_{comp}$ is given by:

$$\frac{\delta \dot{W}_{comp}}{\dot{W}_{comp}} = \sqrt{\left(\frac{q_{HEX,Tx}}{\dot{W}_{comp}}\right)^2 \left(\frac{\delta q_{HEX,Tx}}{q_{HEX,Tx}}\right)^2 + \left(\frac{q_{evap,Tx}}{\dot{W}_{comp}}\right)^2 \left(\frac{\delta q_{Evap,Tx}}{q_{Evap,Tx}}\right)^2} \tag{13}$$

where δx/x denotes the relative uncertainty associated with a random variable x. The relative uncertainties in $\dot{W}_{comp}$ ranged from approximately 4% to 12%. For the COP, the uncertainty was calculated from:

$$\frac{\delta COP}{COP} = \sqrt{\left(\frac{\delta \dot{W}_{comp}}{\dot{W}_{comp}}\right)^2 + \left(\frac{\delta q_{HEX,Tx}}{q_{HEX,Tx}}\right)^2} \tag{14}$$

which ranged between approximately 4% and 13%. The uncertainty for the heat of reaction, $\Delta H$, was estimated as ±17%, and consequently c was estimated as ±60%.

Experiments were conducted to determine the ability of the system 10 to cool and maintain a prescribed temperature of the load coolant (fluid) 75 under various conditions. Steady-state and transient response experiments were conducted in which the coolant inlet temperature was varied while the flow rate was held constant at approximately 10 L/min, as shown in Table 2. The results from the steady-state and transient experiments are described below.

One concern with this configuration of the system 10 is the potential for a thermal capacity mismatch among the HEX reactor 25, the VCS 40, and the applied thermal load 45. As described above, the VCS 40 increases the temperature at which heat is transferred from the applied thermal load 45 to the HEX reactor 25 such that the required AC reaction temperature for rapid decomposition is attained. However, during this process, inherent inefficiencies associated with the VCS 40, in turn, may generate heat. The cooling capacity available with the HEX reactor 25 has to accommodate heat from both the VCS 40 and the applied thermal load 45. Thus, preliminary experiments were conducted to establish the upper limits of the heat absorption rates and explore the system controllability.

Figure 6:
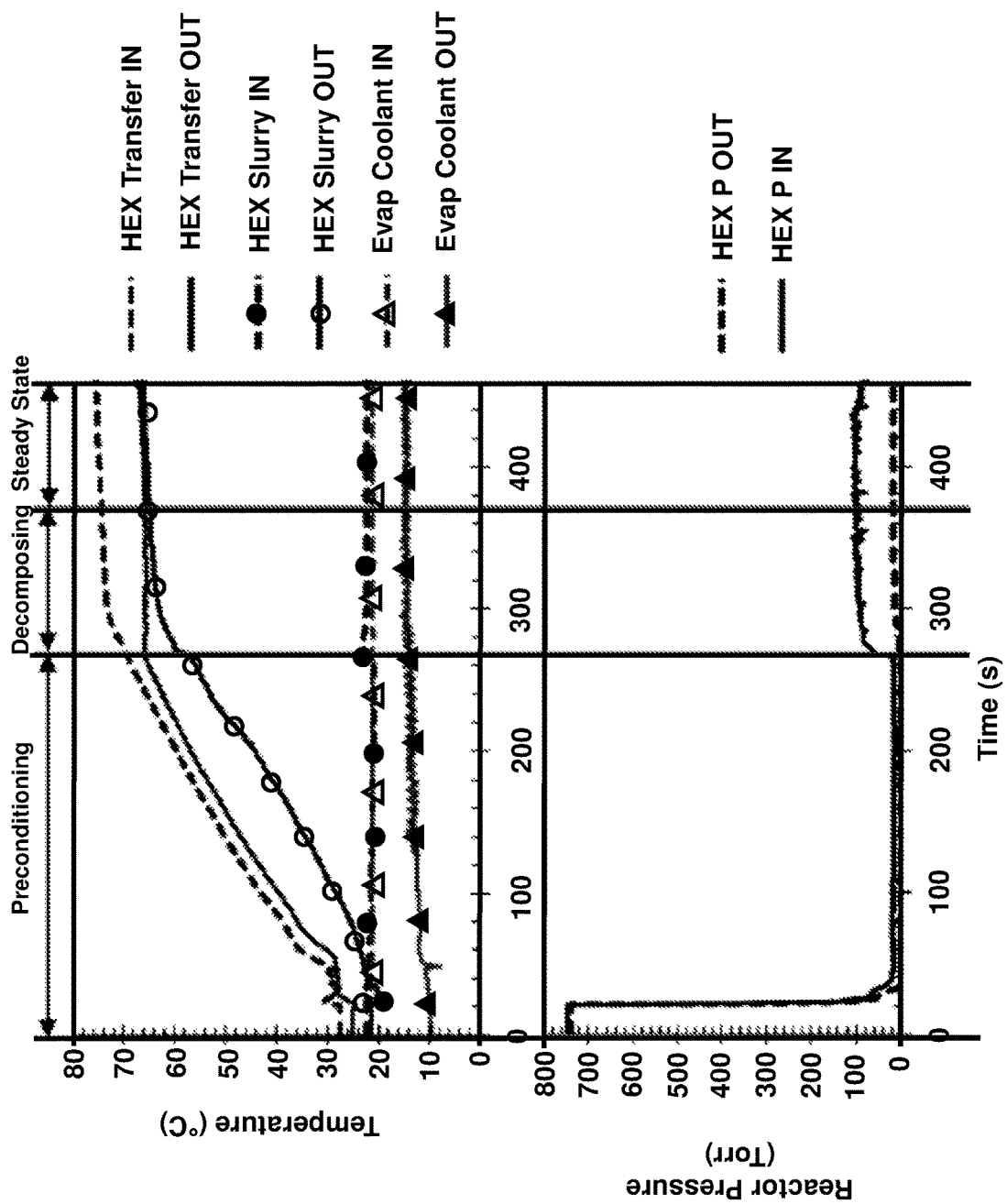
FIG. 6 is a graphical illustration depicting results for a heat exchanger (HEX) reactor temperature and pressure, coolant temperature, and AC feed histories during an uncontrolled-capacity preliminary experiment, according to an embodiment herein.

FIG. 6 shows the imposed heat load coolant 75 and HEX reactor temperatures and HEX reactor reactant pressures for a typical characterization experiment to illustrate the sequence of operations. More particularly, FIG. 6 shows the temperatures associated with transfer side 12 of the HEX reactor 25, slurry generator 15, and evaporator 42. The bottom portion of FIG. 6 depicts the pressures for the inlet/outlet of the HEX reactor 25. For the first twenty seconds, the system 10 opens the unloader valve (not shown) of the vacuum pump 21 to reduce the sudden pressure change in the HEX reactor 25. For the next two minutes, the VCS 40 preconditions the HEX reactor 25 by increasing the temperature to the reaction temperature. Rising temperatures in the HEX reactor 25 indicate that the VCS 40 is absorbing heat from the coolant 75 and transferring it to the HEX reactor 25, but the HEX reactor 25 has not yet reached the selected reaction temperature to begin AC injection and decomposition. Also, during the preconditioning period, the expansion valve (not shown) of the VCS 40 is active, controlling the amount of heat absorbed from the coolant loop. At approximately 260 seconds, the HEX reactor 25 reaches the reaction temperature, and the slurry generator 15 begins injecting AC (e.g., heat absorption material 30), and the HEX reactor 25 begins removing heat via AC decomposition, which marks the beginning of the decomposition period. The transfer loop outlet temperature of the HEX reactor 25 quickly levels off to approximately 65° C., which is maintained for the duration of the experiment. The transfer loop inlet temperature continues to rise, but at a much lower rate, indicating that the total heat absorbed in the HEX reactor 25 is slightly less than the amount of heat transferred from the VCS 40, which is most likely due to thermal capacitance effects provided by the TES 50. During this period the coolant temperature difference is maintained at approximately 6° C. Thus, the coolant temperature was well managed in the experiment. The rise in the reactant side 11 inlet pressure (e.g., at inlet 8) is due to the flow resistance imposed by the isolator orifice 24 of the HEX reactor 25. At approximately 430 seconds, the AC supply has been depleted, and the HEX reactor 25 outlet temperature begins to rise, indicating a heat absorption reduction in the system 10.

Experimentally, it is determined that the system 10 achieved steady state during the decomposition phase once the load inlet temperature (e.g., at the inlet 8) of the HEX reactor 25 ceased to vary by more than approximately 0.01° C./s over a 60 second period. The average fluid temperature and flow rates were taken over this interval, from which the steady state heat transfer rate was computed using Eq. (7). The repeatability of the calculated heat transfer among the three steady load, uncontrolled capacity experiments (within 3%) confirms this steady state criterion to be applicable. In FIG. 6, the steady state approximation is invoked over the time interval of approximately 370-430 seconds. The temperature rise at the inlet 7 of the transfer loop 27 is 0.013° C./s, while the average coolant temperature change is effectively zero. FIG. 6 shows an oscillatory behavior in the coolant outlet temperature. This behavior was a result of the controller 55, which "hunted" about the set point during operation. The coolant outlet temperature varied about the average (e.g., approximately 14.6° C.)±1.5° C. at a rate of 0.5 Hz.

For an imposed thermal load coolant inlet temperature initially at approximately 21° C., the heat absorption rate averaged approximately 4481 W, with an average outlet temperature of approximately 14.6° C. Table 3 shows the results of the steady load experiments without capacity control.

TABLE 3

Results from initial steady-state characterization experiments without capacity control

| Test | AC flow rate (g/s) | Coolant flow rate (g/s) | Slurry inlet temp. (° C.) | HEX reactor heat rejection rate (W) | Coolant outlet temp. (° C.) | Coolant heat absorption rate (W) | COP |
|---|---|---|---|---|---|---|---|
| 1 | 1.78 | 161.33 | 23.6 | 5699.5 | 14.5 | 4526.9 | 3.86 |
| 2 | 1.85 | 160.66 | 22.3 | 5813.8 | 14.6 | 4502.6 | 3.43 |
| 3 | 1.85 | 151.35 | 24.9 | 6186.0 | 14.8 | 4415.5 | 2.49 |

For the third experiment (e.g., Test 3 in Table 3) the VCS superheat was reduced in an attempt to increase the coolant outlet temperature. However, the estimated COP of the VCS 40 was 30% lower than the other two experiments (e.g., Tests 1 and 2). This suggests that although the heat absorption capacity of the system 10 may be controlled using superheat, the reduction in efficiency makes the method undesirable due to the excess heat that must be removed by the HEX reactor 25.

The capacity (e.g., heat transfer capability) of the VCS 40 is a complex function of the operating conditions for each system component (e.g., condenser 41, evaporator 42, compressor 43, etc.) and the thermal load 45. In order to maintain these conditions, and by extension the temperature in HEX reactor 25 to drive AC decomposition, as well as the target coolant temperature, the capacity of the VCS 40 should be balanced with the imposed heat load. Thus, it is preferred to understand how to properly control the heat absorption rate (e.g., capacity) of the system 10 in response to the thermal load 45 and coolant temperature constraints. Steady-state experiments were conducted to investigate how well the capacity was controlled when subjected to different thermal loads 45 and coolant inlet/outlet temperature constraints. It was initially suspected that the overall capacity of the system 10 might be controlled by the capacity of the VCS 40. Thus, an attempt to use a VCS hot-gas bypass controller temperature set point to control the coolant outlet temperature was made. Each experiment in this series used a different (e.g., fixed) coolant inlet temperature, and the coolant flow rate was constant for all experiments. The first two experiments had a heat absorption rate goal of approximately 4000 W (e.g., near full design capacity), whereas the third experiment was intended to demonstrate the lower absorption rate of approximately 2000 W (e.g., approximately half design capacity). VCS hot-gas bypass control was again used to accomplish the reduction. Table 4 lists the temperatures, flow rates, and heat absorbed in each of the controlled-capacity experiments.

TABLE 4

Steady-state controlled-rate experiment performance targets and results

| Coolant inlet temp. (° C.) | AC flow rate (g/s) | Coolant rate target (W) | Process outlet temp. target (° C.) | Process outlet temp. (° C.) | Actual cooling rate (W) | Conversion | COP |
|---|---|---|---|---|---|---|---|
| 21 | 1.86 | 4000 | 15.5 | 16.1 | 3538.8 | 1.06 | 1.77 |
| 18 | 1.91 | 4000 | 12.5 | 13.0 | 3595.6 | 1.04 | 1.86 |
| 17 | 1.89 | 2000 | 14.0 | 14.5 | 1986.3 | 0.99 | 0.77 |

Each experiment achieved heat absorption rates and coolant outlet temperatures within approximately 12% and 4.5% of their targets, respectively, with the reduced-capacity experiment achieving heat absorption within 3% of the target heat rejection rate. Conversion fraction estimates from Eq. (12) were approximately 100%.

Table 4 shows that the VCS hot gas bypass method sufficiently controlled the capacity of the system 10. However, the COP listed for each experiment indicates that the hot-gas bypass control method introduces some inefficiency. The full-capacity experiments demonstrated total heat absorption in the HEX reactor 25 to be approximately 50% higher than the heat removed from the coolant 75, the additional heat arising from compressor work input and inefficiencies expressed in Eq. (11). For the reduced-capacity experiment, the total heat absorption rate of the HEX reactor 25 was approximately 130% higher than the heat removed from the coolant 75, which implies a significant thermal efficiency penalty is incurred when a HGBV (not shown) is employed to throttle the capacity of the VCS 40.

Figure 7:
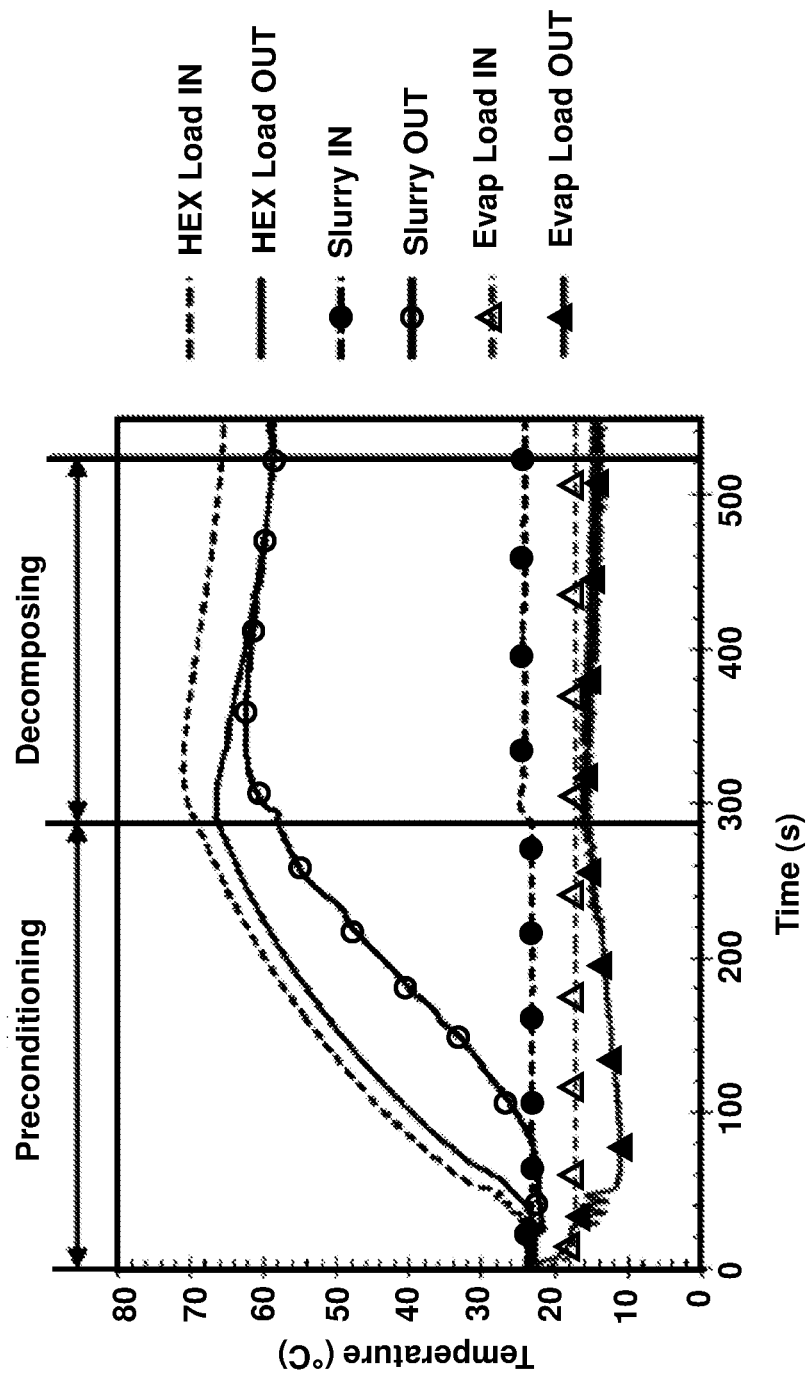
FIG. 7 is a graphical illustration depicting results for a HEX reactor and process fluid temperatures for the reduced-capacity experiment, according to an embodiment herein.

FIG. 7 shows the HEX reactor 25 transfer side 12 and inlet and outlet temperatures of the coolant supply 47 during the reduced cooling rate experiment. The temperatures of the transfer side 12, and thus the temperature in the VCS condenser 41, are shown to continue to fall after an initial peak once AC decomposition has begun. To account for this behavior, the energy balance of the HEX reactor 25 utilized Eqs. (8) and (9). The outlet temperature of the condenser 41 dropped 6° C. from 300 to 500 seconds, which suggests that the AC mass flow rate was higher than desired and, as a consequence, the HEX reactor 25 removed more heat from the system 10 than desired. However, during the same period, the coolant outlet temperature was effectively steady, in the range of approximately 15±1° C. Since the capacity of the HEX reactor 25 exceeded the imposed heat load for the third test, the HEX reactor 25 did not attain steady-state, according to the criterion described above, during the limited length of the decomposition period. This was indicated by the continuously decreasing temperatures in the HEX reactor 25 shown in FIG. 6 following the start of the decomposition phase of the experiment.

In FIG. 7, the behaviors of the temperatures of the thermal load 45 associated with the inlet/outlet 8, 9 of the HEX reactor 25, slurry generator 15, and evaporator 42 shows the "hunting" behavior observed in all steady-state experiments. However, since the temperature stability goal was ±2° C., the performance of the system 10 was within design constraints. Since the controller 55 utilizes a finite error signal to generate a control output, a steady-state temperature offset in the coolant outlet temperature of approximately +0.5° C. was observed consistently.

In some thermal management systems, the thermal load 45 may be unsteady. Thus, experiments were conducted in which the thermal load 45 presented to the system 10 varied in time. One set of experiments was performed without the TES 50 (e.g., apparatus 5a shown in FIG. 4) to study the dynamic response of the system 10 without damping. A second set used the TES 50 to explore the thermal behavior of the system 10 with damping (e.g., apparatus 5b shown in FIG. 5).

The unsteady load experiments without the TES 50 exhibited severe coolant temperature stability issues, wherein rapid cycling of the VCS compressor 43 caused the coolant outlet temperature to vary between approximately 8 and 21° C., well outside the ±2° C. tolerance. Based on these experiments, the VCS 40 may not adequately control the coolant temperature within the established limits while subjected to short periods of heating. Indeed, VCS control under highly dynamic loading conditions, especially with strict temperature requirements, may be achieved using multi input/multi output control algorithms and/or system architectures capable of dynamically controlling pressures, refrigerant charge, or other parameters. Accordingly, the TES 50 may provide a viable remedy to this issue.

Figure 8:
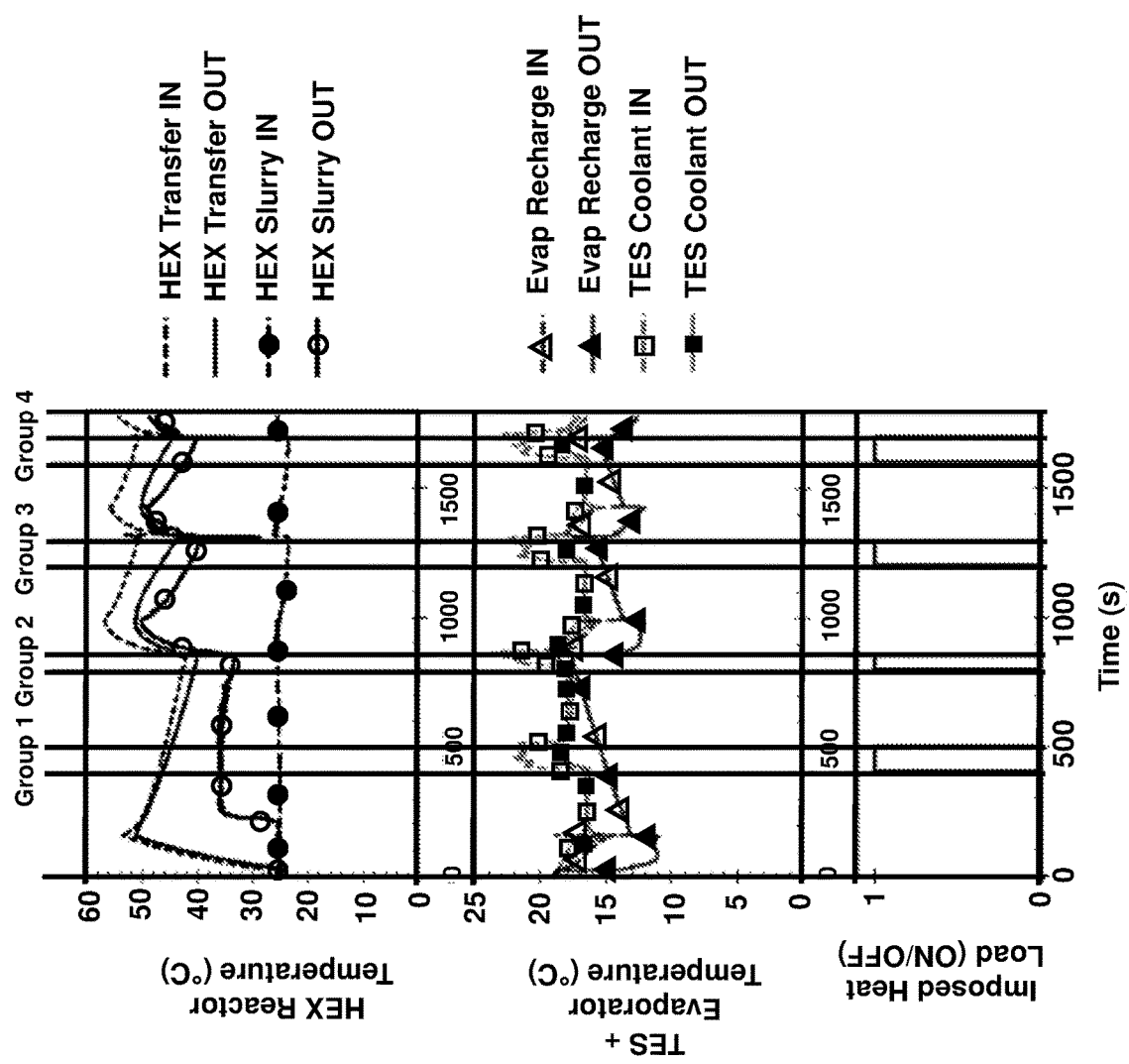
FIG. 8 is a graphical illustration depicting results for a temperature history of a HEX reactor transfer loop, a HEX reactor slurry loop, and an evaporator coolant loop for a transient heat load experiment with a thermal energy storage system, according to an embodiment herein.

Therefore, an additional set of dynamic heat load experiments were conducted with the TES 50 incorporated as an intermediate step between the subsystem 46 and system 10, as shown in FIG. 5. The significant thermal capacitance of the TES 50 (during the phase transition) effectively decoupled the imposed heat load dynamics from the system 10, and consequently the evaporator 42 experienced what was comparable to a steady heat load regardless of pulsed load source input. FIG. 8 shows the temperature and load heater power output histories of a TES 50-integrated experiment. The outlet temperature of the coolant supply 47 during operation of the system 10 averaged approximately 13° C. while the inlet coolant supply 47 temperature remained within approximately 18±1° C.

FIG. 8 shows that the power of the thermal load heater 48 was cycled through four multi-pulse groups in this experiment. Three groups produced a nominal 300 kJ of heat each; the second burst was truncated due to the TES 50 not being recharged before the burst occurred (the coolant upper limit of 19.5° C. was exceeded). An initial period of operation of the VCS 40 is indicated by the rise in the temperatures of the HEX reactor 25 and VCS 40 from 10 to 60 seconds. This period was used to pre-charge the TES 50 and preheat the HEX reactor 25.

Figure 9:
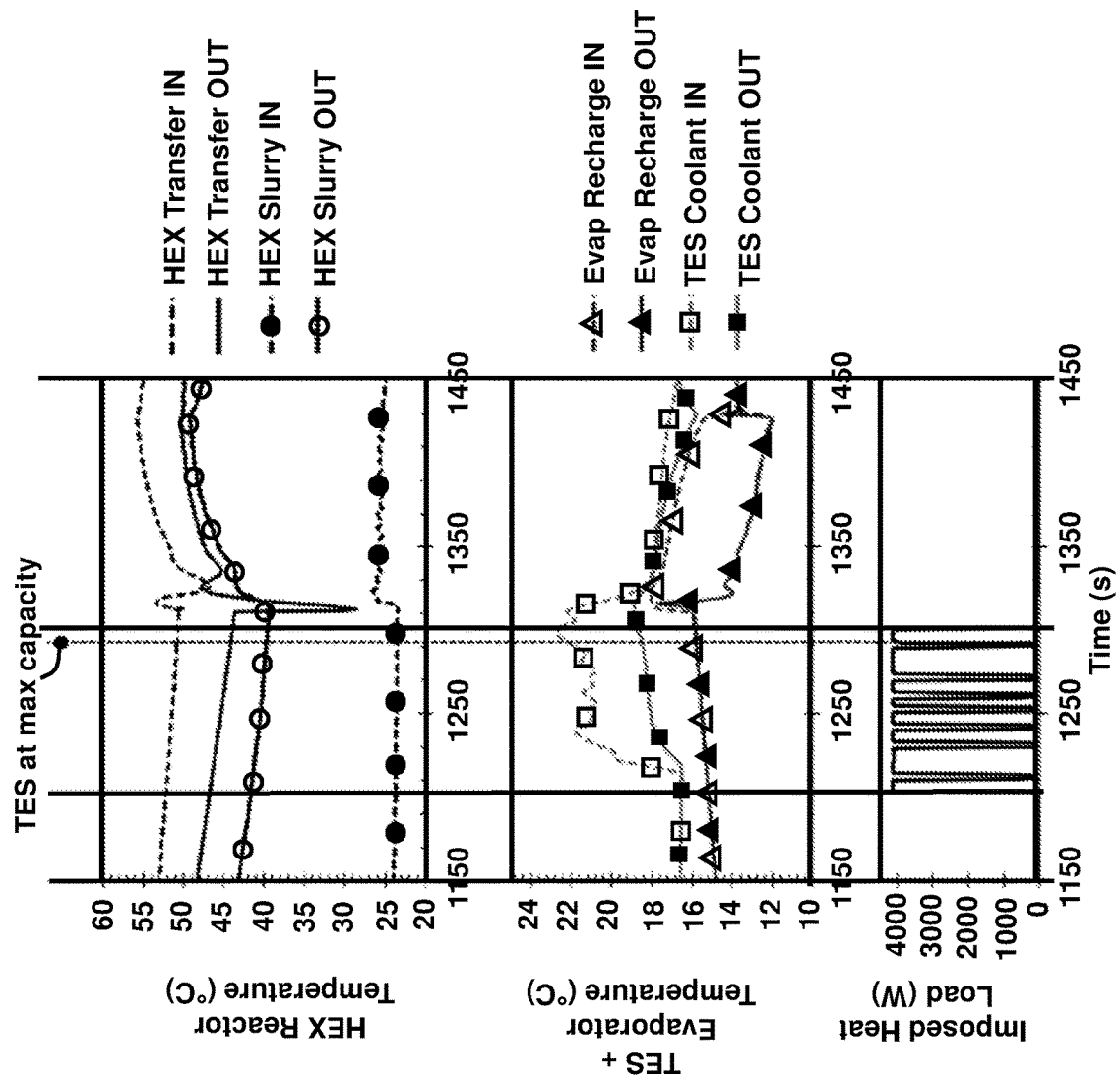
FIG. 9 is a graphical illustration depicting representative temperature responses to pulsed heat input during a TES-integrated dynamic heat load experiment, according to an embodiment herein.

A magnification of the first heater pulse group (i.e., Group 1) and recharge cycle of the TES 50 of FIG. 8 is shown in FIG. 9. During the seventh heater pulse (e.g., at approximately 1290 seconds in FIG. 9), the TES 50 became fully discharged, as indicated by the increase in the slope in the outlet temperature of the coolant supply 47. This rise triggered the system 10, which started recharging the TES 50 and cooling the coolant 75 approximately 20 seconds after discharge of the TES 50 was detected. During the entire cycle the temperature of the coolant supply 47 was remained within approximately 1° C. of the coolant set point of 18° C. The recharge period of the TES 50 lasted approximately 100 seconds, and ended when the coolant outlet temperature of the TES 50 dropped below the cut-off temperature set point of 16.5° C. of the system 10. The temperature of the coolant inlet remained within approximately 1° C. of the phase change temperature of 18° C. of the TES 50. An approximately 10° C. difference between inlet and outlet temperatures of the coolant supply 47 occurred during the 'on' cycles of the system 10. The TES 50 provided a thermal buffer between the system 10 and the coolant 75, thereby preventing the temperature swing in the recharge loop from propagating to the coolant loop. Table 5 shows the results of transient heat absorption experiments with TES 50. The values represent average measurements over the steady operating periods of multiple TES 50 recharging cycles per experiment.

TABLE 5

Summary of unsteady heat load experiments with TES (Test 1) and without TES (Test 2)

| Group # | Duration (s) | Duty Cycle | Avg. $q_{load}$ (W) | q recharge (W) | $q_{HEX, Tx}$ (W) | ε |
|---|---|---|---|---|---|---|
| Unsteady load, with TES (Test 1) | | | | | | |
| 1 | 87.8 | 0.81 | 3322 | — | — | — |
| 2 | 97.2 | 0.78 | 3153 | 2052 | 5504 | 0.73 |
| 3 | 96.5 | 0.81 | 3225 | 2218 | 4723 | 0.81 |
| Unsteady load, with TES (Test 2) | | | | | | |
| 1 | 96.5 | 0.78 | 3142 | — | — | — |
| 2 | 53.3 | 0.80 | 3230 | 2773 | 3028 | 0.74 |
| 3 | 96.5 | 0.78 | 3085 | 2340 | 3718 | 0.99 |
| 4 | 97.2 | 0.84 | 3349 | 2331 | 3985 | 0.99 |

Figure 10:
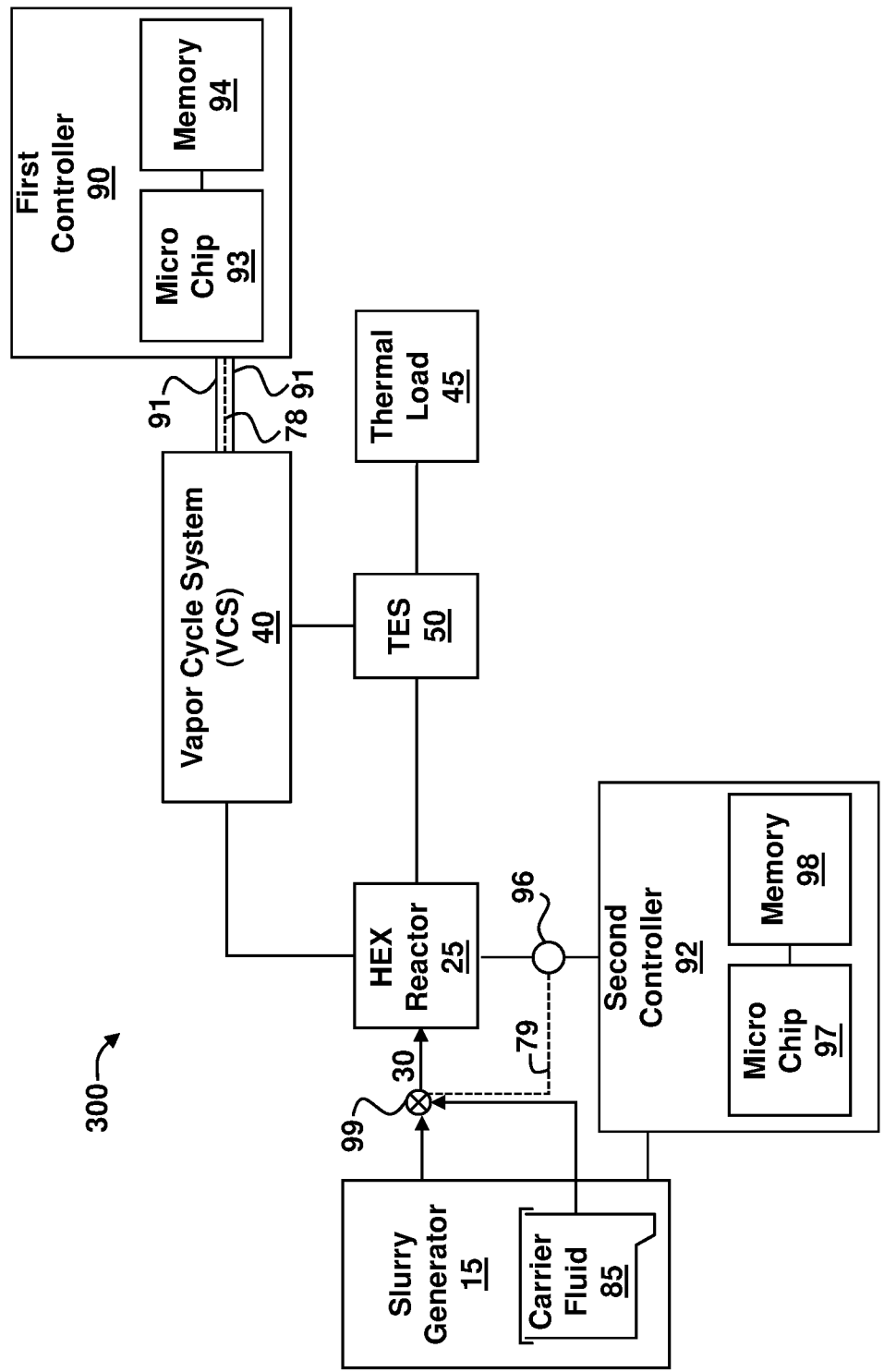
FIG. 10 is a system block diagram illustrating a heat sink, according to an embodiment herein.

FIG. 10, with reference to FIGS. 1 through 9, illustrates a system diagram of a heat sink 300 comprising the HEX reactor 25 to permit an expendable heat absorption material 30 to absorb heat from a thermal load 45 at a temperature above 60° C. and a pressure below 3 kPa, wherein the expendable heat absorption material 30 endothermically decomposes. The vapor cycle system 40 is coupled to the HEX reactor 25 and is configured to transfer heat from the thermal load 45. A first controller 90 is provided to regulate a heat absorption into the vapor cycle system 40. In various embodiments, the first controller 90 may be any type of processor, microcontroller, application specific processor, application specific integrated circuit, or digital signal processor. In an example, the first controller 90 may comprise thermocouples 91 to detect the temperature of the vapor cycle system 40. The thermocouples 91 may be operatively connected to a microprocessing chip 93, which compares detected temperature readings from the thermocouples 91 to preprogrammed temperature levels stored in memory 94 and accessed by the microprocessing chip 93. Accordingly, the microprocessing chip 93 controls the amount of heat absorbed by the vapor cycle system 40 by transmitting a control signal 78 to the vapor cycle system 40 to maintain the temperature in the vapor cycle system 40 so that the temperature is within a permitted range of the preprogrammed temperature levels. The heat sink 300 may also comprise a heat capacitor (e.g., TES 50), which is operatively connected to the vapor cycle system 40, wherein the heat capacitor (e.g., TES 50) is configured to isolate the heat exchanger reactor 25 from thermal transients of the thermal load 45. The expendable heat absorption material 30 may comprise an ammoniated salt. The heat sink 300 may further comprise a carrier fluid 85 mixed with the expendable heat absorption material 30 in a mixer 99, wherein the carrier fluid 85 comprises any of ethylene glycol and propylene glycol. A second controller 92 is provided to regulate an amount of the expendable heat absorption material 30 into the HEX reactor 25. In various embodiments, the second controller 92 may be any type of processor, microcontroller, application specific processor, application specific integrated circuit, or digital signal processor. In an example, the second controller 92 may comprise a regulator 96, which may be operatively connected to the mixer 99, the HEX reactor 25, and a microprocessing chip 97, which compares the amount of expendable heat absorption material 30 in the HEX reactor 25 to preprogrammed desired heat absorption material levels stored in memory 98 and accessed by the microprocessing chip 97. Accordingly, the microprocessing chip 97 transmits a signal 79 to the regulator 96 to control the amount of expendable heat absorption material 30 sent from the mixer 99 to the HEX reactor 25 so that the amount of expendable heat absorption material 30 in the HEX reactor 25 is within a permitted range of the preprogrammed heat absorption levels.

FIG. 11, with reference to FIGS. 1 through 10, is a flow diagram illustrating a method 200 for managing heat transfer of a thermal load 45, the method 200 comprising providing (202) a thermal management system 10 comprising a heat exchanger reactor 25 containing an expendable heat absorption material 30; applying (204) heat from a thermal load 45 to the thermal management system 10 at a temperature between approximately 18-30° C. using a thermal load coolant 75; transferring (206) heat from the thermal load 45 to a transfer fluid (e.g., carrier fluid 85) at a temperature above approximately 60° C. creating the heated (e.g., carrier fluid 85), wherein the heated (e.g., carrier fluid 85) is introduced into the heat exchanger reactor 25; transferring (208) heat from the heated (e.g., carrier fluid 85) into the expendable heat absorption material 30, wherein the expendable heat absorption material 30 endothermically decomposes into a gaseous by-product 35; and maintaining (210) the thermal load coolant 75 within a specified temperature range independent of heat load dynamics.

In one example, the method 200 may comprise applying the heat from the thermal load 45 at a steady rate. In another example, the method may comprise applying the heat from the thermal load 45 at an unsteady rate. The method 200 may comprise calculating an amount of heat transfer from the thermal load 45 to the expendable heat absorption material 30. The expendable heat absorption material 30 may comprise an ammoniated salt. The expendable heat absorption material 30 may comprise any of ammonium carbamate and ammonium bicarbonate. The method 200 may comprise suspending the expendable heat absorption material 30 in a carrier fluid 85 comprising any of ethylene glycol and propylene glycol. The method 200 may comprise isolating the heat exchanger reactor 25 from thermal transients of the thermal load 45. The method 200 may comprise controlling (e.g., using controller 55) a temperature of the thermal load 45 being applied to the thermal management system 10 to approximately an ambient temperature surrounding the thermal load 45.

The embodiments herein provide a thermal management of a thermal load 45 using the endothermic decomposition of an expendable heat absorption material 30, such as AC. Experimentally, the thermal load 45 may be specified to be either unsteady pulsed or steady continuous operation from 0 to 4000 W at slightly sub-ambient temperature (e.g., approximately 15-21° C.). Experiments were conducted which demonstrate controlled heat absorption of approximately 1986 W and 3600 W with thermal load coolant return temperature targets of approximately 15.5° C., 12.5° C., and 14° C.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Those skilled in the art will recognize that the embodiments herein can be practiced with modification within the spirit and scope of the appended claims.

What is claimed is:

1. A method for managing heat transfer of a thermal load, the method comprising:
   providing a thermal management system comprising a heat exchanger reactor containing an expendable heat absorption material, the thermal management system comprising
      a slurry generator comprising a gravimetric feeder, a mixer, and a charge pump, wherein the gravimetric feeder meters the heat absorption material into the mixer, and the charge pump meters a carrier fluid into the mixer, wherein the mixer suspends the heat absorption material in the carrier fluid to make a slurry;
      an injector pump fluidly coupled to the slurry generator;
      a heat exchanger reactor fluidly coupled to the injector pump, the heat exchanger reactor receiving the slurry from the injector pump, wherein the heat exchanger reactor is adapted to subject the expendable heat absorption material to a temperature above 60° C. and a pressure below 3 kPa, and wherein the expendable heat absorption material endothermically decomposes into a gaseous by-product; and
      a vapor cycle system coupled to the heat exchanger reactor and operatively connected to the thermal load;
   applying heat from the thermal load to the thermal management system at a temperature between approximately 18-30° C. using a thermal load coolant;
   transferring heat from the thermal load to a transfer fluid at a temperature above approximately 60° C. creating a heated transfer fluid, wherein the heated transfer fluid is introduced into the heat exchanger reactor;
   transferring heat from the heated transfer fluid into the expendable heat absorption material, wherein the expendable heat absorption material endothermically decomposes into the gaseous by-product; and
   maintaining the thermal load coolant within a specified temperature range independent of heat load dynamics.

2. The method of claim 1, comprising applying the heat from the thermal load at a steady rate.

3. The method of claim 1, comprising applying the heat from the thermal load at an unsteady rate.

4. The method of claim 1, comprising calculating an amount of heat transfer from the thermal load to the expendable heat absorption material.

5. The method of claim 1, wherein the expendable heat absorption material comprises an ammoniated salt.

6. The method of claim 1, wherein the expendable heat absorption material comprises any of ammonium carbamate and ammonium bicarbonate.

7. The method of claim 1, comprising suspending the expendable heat absorption material in a carrier fluid comprising any of ethylene glycol and propylene glycol.

8. The method of claim 1, comprising isolating the heat exchanger reactor from thermal transients of the thermal load.

9. The method of claim 1, comprising controlling a temperature of the thermal load to approximately an ambient temperature surrounding the thermal load.

\* \* \* \* \*